United States Patent
Koyama et al.

(10) Patent No.: US 7,138,165 B2
(45) Date of Patent: Nov. 21, 2006

(54) INTERMEDIATE FOR OPTICAL RECORDING MEDIUM, MOLD, MOLDING APPARATUS, AND METHOD OF MANUFACTURING OPTICAL RECORDING MEDIUM

(75) Inventors: Atsushi Koyama, Tokyo (JP); Mamoru Usami, Tokyo (JP); Kenji Yamaga, Tokyo (JP); Mikio Domon, Tokyo (JP)

(73) Assignee: TDK Corporation, Tokyo (JP)

( * ) Notice: Subject to any disclaimer, the term of this patent is extended or adjusted under 35 U.S.C. 154(b) by 279 days.

(21) Appl. No.: 10/670,375

(22) Filed: Sep. 26, 2003

(65) Prior Publication Data

US 2004/0061247 A1    Apr. 1, 2004

(30) Foreign Application Priority Data

Sep. 27, 2002    (JP)    ............... 2002-282159

(51) Int. Cl.
    *B32B 3/00*    (2006.01)
(52) U.S. Cl. ............... 428/64.4; 264/1.33; 369/272.1; 720/718
(58) Field of Classification Search ............... 264/1.33; 369/272.1; 428/64.4; 720/718
    See application file for complete search history.

(56) References Cited

U.S. PATENT DOCUMENTS 5,541,910 A * 7/1996 Tanaka et al. ............... 720/723
2004/0149096 A1 * 8/2004 Ide et al. ............... 83/98
2004/0191352 A1 * 9/2004 Koyama et al. ............... 425/406
2004/0212122 A1 * 10/2004 Koyama et al. ............... 264/107
2005/0053751 A1 * 3/2005 Komaki ............... 428/64.4
2005/0201264 A1 * 9/2005 Ushida et al. ............... 369/275.5

FOREIGN PATENT DOCUMENTS

JP    10-40584    2/1998
JP    10249264    9/1998

OTHER PUBLICATIONS

English Language Abstract of JP 10-40584.
English Language Abstract of JP 10-249264.

* cited by examiner

*Primary Examiner*—Bruce H. Hess
(74) *Attorney, Agent, or Firm*—Greenblum & Bernstein, P.L.C.

(57) ABSTRACT

There is provided an intermediate for an optical recording medium, which can be uniformly coated with resin by the spin coating method without using a resin coating-assisting member, and allows formation of a central mounting hole without burrs. The intermediate comprises a hollow cylindrical protruding portion protruding from one surface on which functional layers are formed and a circular recess formed in a central portion of the other surface and having a diameter equal to that of the central mounting hole, and a temporary central hole formed to extend through a central portion of the recess and having a diameter smaller than that of the recess. The protruding portion has an outer diameter smaller than the diameter of the mounting hole and an inner diameter not smaller than the diameter of the temporary central hole, and has a central axis thereof substantially aligned with a center of the temporary central hole.

7 Claims, 8 Drawing Sheets

INTERMEDIATE FOR OPTICAL RECORDING MEDIUM, MOLD, MOLDING APPARATUS, AND METHOD OF MANUFACTURING OPTICAL RECORDING MEDIUM

BACKGROUND OF THE INVENTION

1. Field of the Invention

The present invention relates to an intermediate for an optical recording medium that has a central mounting hole formed in a central portion thereof and at least one kind of functional layer formed on one side thereof, for use in at least one of information recording and information reproduction, a mold for manufacturing the intermediate for an optical recording medium, a molding apparatus including the mold, and a method of manufacturing the optical recording medium by using the intermediate for an optical recording medium.

2. Description of the Related Art

For example, in a method of manufacturing an optical recording medium, such as a CD (Compact Disk) or a DVD (Digital Versatile Disk), first, a disk-shaped substrate DP having a shape shown in FIG. 20 is molded by injecting resin into a mold having a stamper set therein. In this step, the central portion of the disk-shaped substrate DP is blanked by a gate cutter incorporated in the mold, whereby a central mounting hole (also used as a central mounting hole of the optical recording medium) MH is formed in the central portion of the disk-shaped substrate DP. Further, micro asperities (not shown) such as grooves are formed in an area (recording area RA) on one surface (upper surface as viewed in FIG. 20) of the disk-shaped substrate DP, where functional layers, referred to hereinafter, are to be formed. Furthermore, an annular projection (so-called stock ring) SR is formed on the other surface (lower surface as viewed in FIG. 20) of the disk-shaped substrate DP. The annular projection SR is formed in a zone between a chucking area CA adjacent to the central mounting hole MH toward the inner periphery of the disk-shaped substrate DP and the recording area RA. Molded disk-shaped substrates DP are stored in a state stacked on a stacker 51 with the central mounting hole MH of each disk-shaped substrate DP being fitted on a stacker pole 51a of the stacker 51. In this case, the disk-shaped substrates DP are stacked with spaces created therebetween by the annular projections SR. Therefore, even if vibrations are applied to the disk-shaped substrates DP in this state, the disk-shaped substrates DP are prevented from being greatly inclined, so that interference between the disk-shaped substrates DP can be avoided, which prevents the surfaces of the disk-shaped substrates DP from being damaged or flawed.

Then, the disk-shaped substrates DP are sequentially taken out from the stacker 51, and various functional layers (reflection layer, recording layer, protective layer, etc.) are sequentially formed in the recording area RA on the one surface of each disk-shaped substrate DP to thereby complete an optical recording medium (not shown). Thereafter, the completed optical recording media are stored on the stacker 51 similarly to the disk-shaped substrates DP. In the step of forming the functional layers, at least one of the functional layers (e.g. the protective layer) is formed by coating resin by the spin coating method and then curing the coated resin by a predetermined curing treatment. In this case, as shown in FIG. 20, a method is employed which coats resin using a disk-shaped member DI as a resin coating-assisting member (see Japanese Laid-Open Patent Publication (Kokai) No. 10-249264), because this method facilitates formation of functional layers (resin layers) uniform in thickness particularly in radial directions. Basically in this method, the disk-shaped member DI is placed on a disk-shaped substrate DP such that the member DI covers the central mounting hole MH as shown in FIG. 20, and then the resin R is dropped from a nozzle NZ onto the disk-shaped member DI for spin coating. Thereafter, the disk-shaped member DI is removed from the disk-shaped substrate DP as shown in FIG. 21, and the disk-shaped substrate DP coated with the resin R up to the outer periphery of the upper surface thereof is conveyed to a site for executing the curing treatment. Since the resin R remains uncured during the conveyance, the disk-shaped substrate DP is carried with an uncoated area (adjacent to the central mounting hole MH) that was covered by the disk-shaped member DI being sucked by a suction device (not shown) or with the central mounting hole MH being made use of by a mechanical chuck (not shown).

However, in the above described method of manufacturing an optical recording medium, maintenance of the used disk-shaped member DI (e.g. cleaning of the disk-shaped member DI having resin R stuck thereto) is troublesome. To overcome this problem, the present inventors developed a method of manufacturing an optical recording medium using an intermediate therefor which is not formed with a central mounting hole MH in its central portion. In this method, first, an intermediate ME, shown in FIG. 23, for a disk-shaped substrate, is molded by the same method as employed in manufacturing the disk-shaped substrate DP. In this step, a central mounting hole MH is not formed through the intermediate ME, but micro asperities (not shown) such as grooves are formed in one surface (upper surface as viewed in FIG. 23) thereof, and an annular projection SR is formed on the other surface (lower surface as viewed in FIG. 23), similarly to the case of manufacturing the disk-shaped substrate DP. Then, various functional layers (reflection layer, recording layer, protective layer, etc.) are sequentially formed in a recording area RA on the one surface of the intermediate ME. When the spin coating method is employed to apply resin R to the intermediate ME for formation of each of the functional layers, the resin R is dropped from a nozzle NZ onto the central portion of the intermediate for spin coating, so that a layer of the resin R is coated which has a substantially uniform thickness in radial directions, as shown in FIG. 24. Thereafter, the central portion of the intermediate ME having all the functional layers (hereinafter collectively referred to as "the layer FL") formed on the one surface thereof is blanked by presswork (blanking using a punch) to form a central mounting hole MH. Thus, an optical recording medium 1 having the central portion thereof formed with the central mounting hole MH, as shown in FIG. 9, is completed. According to this method of manufacturing an optical recording medium, since the disk-shaped member DI is not used for spin coating, it is possible to save time and labor required for troublesome maintenance of the disk-shaped member DI.

However, from the study of the above described method of manufacturing an optical recording medium, the present inventors found out the following problems to be solved: In the manufacturing method, first, the intermediate ME without the central mounting hole MH is molded, and then the layer FL is formed on the intermediate ME, whereafter the central mounting hole MH is formed by presswork. Therefore, in a case where the spin coating method is employed for formation of functional layers, since the central mounting hole MH is not yet formed in the intermediate ME when the intermediate ME coated with uncured resin R need be conveyed to the site for carrying out curing treatment, it is difficult to use the aforementioned mechanical chuck. Further, since the area that is not coated with the resin R does not exist on the intermediate ME, it is also difficult to use the aforementioned suction device. Therefore, improvement in this point is desirable. In this connection, a method can be contemplated which uses a device additionally provided for partially curing the resin R to cure part of the resin R on the central portion of the intermediate ME, for allowing the suction device to suck the cured portion. However, this method necessitates the device for partially curing the resin R, which requires new expenditures on plant and equipment. Further, since the step of partially curing the resin R is added, manufacturing time is increased, causing reduced production of optical recording media 1 per unit time, resulting in an increase in manufacturing costs.

Further, in this method of manufacturing an optical recording medium, since the central mounting hole MH is not formed until the presswork is completed in a final step, it is impossible to use the stacker 51 conventionally used, for storing molded intermediates ME or holding intermediates ME having passed through one processing step until the succeeding processing step starts. To overcome this problem, a method of storing intermediates ME can be considered which uses a stacker 61 having a plurality of stack poles 61a (three stack poles 61a in the illustrated example) erected on the same circumference as shown in FIG. 25 to store intermediates ME therein in a stacked manner. In this case, the intermediates ME held within the stack poles 61a, 61a, 61a have respective outer peripheral edges thereof supported by the stack poles 61a, 61a, 61a. Although not shown, another method can be considered which uses a storage case having a plurality of grooves formed therein at equal space intervals, each for receiving the outer peripheral edge of an intermediate ME, to store intermediates ME in a vertical position in parallel with each other in the side-by-side arrangement. In the former storing method, however, since each intermediate ME has its outer peripheral edge supported only by the stack poles 61a, 61a, 61a, when vibrations are applied to a plurality of intermediates ME stacked one upon another, the intermediates ME easily lose their balance and are tilted as shown in FIG. 26. This also raises a problem to be solved. In the latter storing method, the area occupied by the storage case is laterally increased in accordance with an increase in the number of stored intermediates ME, and hence it is difficult to allocate enough space for the storage case when the number of intermediates ME to be stored is large.

Moreover, in this method of manufacturing an optical recording medium, the central portion of an intermediate ME to be blanked by presswork to form the central mounting hole MH has the same thickness as that of a portion surrounding the central portion, and hence burrs can be formed on the inner peripheral surfaces of the intermediate ME and the layer FL defining the central mounting hole MH, during blanking using a punch. If burrs are formed, the optical recording medium 1 is likely to be mounted on a drive device in an off-center position. In such a case, the optical recording medium 1 vibrates when it is rotated, which makes it difficult to record information thereon or reproduce information therefrom, with accuracy. Therefore, improvement in this point is desirable.

SUMMARY OF THE INVENTION

The present invention has been made in view of these points to be improved, and a first object thereof is to provide an intermediate for an optical recording medium, which can be uniformly coated with resin by the spin coating method without using a resin coating-assisting member, stored in a stable state while saving space, and conveyed by a conventional conveyor device even when the resin applied thereto remains uncured, and allows formation of a central mounting hole without burrs. A second object of the present invention is to provide a mold and a molding apparatus for manufacturing the intermediate for an optical recording medium mentioned above. Further, a third object of the present invention is to provide a method of manufacturing an optical recording medium which can be uniformly coated with resin by the spin coating method without using a resin coating-assisting member, and conveyed by a conventional conveyor device even when the resin applied thereto remains uncured, and allows formation of a central mounting hole without burrs.

To attain the first object, in a first aspect of the present invention, there is provided an intermediate for an optical recording medium that has a central mounting hole formed in a central portion thereof and at least one kind of functional layer formed on one side thereof, for use in at least one of information recording and information reproduction, the intermediate being produced beforehand for manufacturing the optical recording medium, the intermediate comprising a hollow cylindrical protruding portion protruding from one surface thereof on the same side as the one side of the optical recording medium, wherein the intermediate has a circular recess formed in a central portion of the other surface thereof on a side opposite to the one side of the optical recording medium and having a diameter equal to a diameter of the central mounting hole, and a temporary central hole formed to extend through a central portion of the circular recess and having a diameter smaller than the diameter of the circular recess, said hollow cylindrical protruding portion having an outer diameter smaller than the diameter of the central mounting hole and an inner diameter equal to or larger than the diameter of the temporary central hole, and having a central axis thereof substantially aligned with a center of the temporary central hole.

To attain the above third object, in a second aspect of the present invention, there is provided a method of manufacturing an optical recording medium that has a central mounting hole formed in a central portion thereof and at least one kind of functional layer formed on one side thereof, for use in at least one of information recording and information reproduction, the method comprising an intermediate-preparing step of preparing the intermediate described above by resin molding, a functional layer-forming step of forming the at least one kind of functional layer on the one surface of the prepared intermediate, and a central hole-forming step of forming the central mounting hole through the intermediate having the at least one kind of functional layer formed thereon.

According to the intermediate for an optical recording medium and the method of manufacturing the optical recording medium, a circular recess having the same diameter as that of the central mounting hole is formed in a central portion of the other surface of the intermediate, and a temporary central hole having a diameter smaller than that of the circular recess is formed in the central portion of the circular recess. Further, a hollow cylindrical protruding portion having an outer diameter smaller than that of the central mounting hole and an inner diameter equal to or larger than that of the temporary central hole, and having a central axis thereof substantially aligned with the center of the temporary central hole is formed such that it protrudes from the one surface of the intermediate. In performing spin coating on the intermediate, the above described construction makes it possible to drop resin in the vicinity of the center of the intermediate without using a resin coating-assisting member, whereby a layer of the resin having a substantially uniform thickness can be formed. This construction of the intermediate makes it possible to dispense with the resin coating-assisting member, and therefore, unnecessary to carry out maintenance, such as cleaning, of the same, so that costs of manufacturing and maintaining the member can be eliminated. Further, provision of the temporary central hole enables intermediates to be stored in a stable state while saving space. Furthermore, by making use of the temporary central hole, it is possible to hold and convey the intermediate using a conventional mechanical chuck (conveyor device) in general use, even if resin applied thereto remains uncured. Therefore, it is unnecessary to introduce any new apparatus for conveying intermediates, and therefore, it is possible to cut expenditures in plant and equipment. Moreover, the central portion to be blanked using a punch, for formation of the central mounting hole, is thin, which facilitate the blanking operation and makes it possible to positively prevent burrs from being formed on the inner peripheral surfaces of the intermediate and the functional layer(s) which define the central mounting hole. Therefore, the optical recording medium formed by using the intermediate can be mounted on a drive device without being positioned off-center, which reduces vibration and shake of the optical recording medium during rotation thereof, so that information can be recorded on the medium or reproduced therefrom with accuracy.

Preferably, a recessed groove is formed in an inner bottom surface of the circular recess, in the vicinity of an inner peripheral surface of the intermediate defining the circular recess, along the inner peripheral surface. According to this preferred embodiment, the thickness of the bottom wall of the circular recess to be blanked by the punch can be further reduced, so that it is possible to blank the bottom wall more easily and reliably prevent burrs from being formed on the inner peripheral surfaces of the intermediate and the functional layer(s) defining the central mounting hole.

Preferably, the diameter of the temporary central hole is set to be equal to or larger than 2 mm. According to this preferred embodiment, it is possible to set the board thickness of chucks of a mechanical chuck for use in conveying the intermediates and the diameter of a stack pole of a stacker for use in storing the intermediates to respective sizes that ensure a minimum strength required for holding the intermediates.

Preferably, the outer diameter of said hollow cylindrical protruding portion is set to be equal to or smaller than 10 mm. According to this preferred embodiment, in application of resin by the spin coating method, it is possible to coat resin substantially uniformly by holding variation in the thickness of applied resin in the recording area of the intermediate e.g. within approximately 5 µm. Further, if the outer diameter of the hollow cylindrical protruding portion is set to 7 mm or less, it is possible to form a more uniform resin film by holding variation in the thickness of applied resin e.g. within approximately 3 µm.

Preferably, a length of protrusion of said hollow cylindrical protruding portion from the one surface of the intermediate is set to be equal to or larger than 0.5 mm. According to this preferred embodiment, it is possible to drop a required amount of resin in spin coating, and prevent the dropped resin from entering the temporary central hole, thereby reducing variation in the thickness of applied resin to form a uniformly coated resin layer.

Preferably, the inner diameter of said hollow cylindrical protruding portion is set to be equal to the diameter of the temporary central hole. According to this preferred embodiment, it is possible to bring the chucks of the mechanical chuck into contact not only with the inner peripheral surface of the temporary central hole, but also with the inner peripheral surface of the hollow cylindrical protruding portion. This makes it possible to increase the frictional force generated between the surfaces of the chucks and the intermediate, thereby enabling the intermediate to be stably held by the mechanical chuck.

To attain the above second object, in a third aspect of the present invention, there is provided a mold for molding an intermediate for an optical recording medium, the mold including a first mold and a second mold, for having molten resin injected into a cavity defined between the first mold and the second mold in a closed state thereof to thereby mold the intermediate, wherein the first mold includes a sprue bush having a through hole formed through a central portion thereof, the through hole opening in an opposed surface of said sprue bush opposed to the second mold, for injection of the molten resin therethrough, and having a diametrically expanded portion that is expanded with at least one step and opening in the opposed surface, and the second mold includes a gate cutter formed with a hollow cylindrical portion protruding from a central portion of an opposed surface of said gate cutter opposed to the first mold, said hollow cylindrical portion having an outer diameter smaller than an inner diameter of the diametrically expanded portion, and wherein when said gate cutter is moved toward said sprue bush in the closed state of the first mold and the second mold, the opposed surface of said gate cutter is protruded into the cavity, and at the same time, said hollow cylindrical portion enters the diametrically expanded portion, whereby a cylindrical space is defined between an inner peripheral surface of the diametrically expanded portion and an outer peripheral surface of said hollow cylindrical portion, as a portion of the cavity, while maintaining a distance between the opposed surface of said gate cutter and the opposed surface of said sprue bush shorter than a thickness of the intermediate.

According to this mold, the through hole of the sprue bush is formed to open in the opposed surface of the sprue bush opposed to the second mold, in a state diametrically expanded with at least one step, and the gate cutter is formed with a hollow cylindrical portion which protrudes from the central portion of the opposed surface of the gate cutter opposed to the first mold, and has an outer diameter smaller than the inner diameter of the diametrically expanded portion. When the gate cutter is moved toward the sprue bush in the closed state of the two molds, the opposed surface of the gate cutter is protruded into the cavity, and at the same time said hollow cylindrical portion enters the diametrically expanded portion, whereby a cylindrical space can be defined between the inner peripheral surface of the diametrically expanded portion and the outer peripheral surface of said gate cutter, as a portion of the cavity, while maintaining the distance between the opposed surface of said molding sleeve and the opposed surface of said sprue bush shorter than the thickness of the intermediate. This makes it possible to accurately and positively mold the intermediate for an optical recording medium, which has the circular recess formed in the central portion of the other surface thereof such that the circular recess has a diameter equal to that of the central mounting hole, and the temporary central hole, smaller in diameter than the circular recess, formed in the central portion of the circular recess, with the hollow cylindrical protruding portion protruding from the one surface thereof.

Preferably, a projection for forming a recessed groove is formed on an outer periphery of the opposed surface of said gate cutter. According to this preferred embodiment, it is possible to accurately and positively mold the intermediate for an optical recording medium, which has the recessed groove formed in the inner bottom surface of the circular recess, in the vicinity of the inner peripheral surface of the intermediate defining the circular recess, along the same.

To attain the above second object, in a fourth aspect of the present invention, there is provided a mold for molding an intermediate for an optical recording medium, the mold including a first mold and a second mold, for having molten resin injected into a cavity defined between the first mold and the second mold in a closed state thereof to thereby mold the intermediate, wherein the first mold includes a sprue bush having a through hole formed through a central portion thereof, the through hole opening in an opposed surface of said sprue bush opposed to the second mold, for injection of the molten resin therethrough, and having a diametrically expanded portion that is expanded with at least one step and opening in the opposed surface, and the second mold includes a molding sleeve having a hollow cylindrical shape and a gate cutter having a hollow cylindrical shape and slidably fitted in said molding sleeve, and wherein when said molding sleeve and said gate cutter are moved toward said sprue bush in the closed state of the first mold and the second mold, an opposed surface of said molding sleeve opposed to said sprue bush is protruded into the cavity, and at the same time said gate cutter enters the diametrically expanded portion, whereby a cylindrical space is defined between an inner peripheral surface of the diametrically expanded portion and an outer peripheral surface of said gate cutter, as a portion of the cavity, while maintaining a distance between the opposed surface of said molding sleeve and the opposed surface of said sprue bush shorter than a thickness of the intermediate.

According to this mold, the through hole of the sprue bush is formed to open in the opposed surface of the sprue bush opposed to the second mold, in a state diametrically expanded with at least one step, and the second mold includes the hollow cylindrical molding sleeve and the hollow cylindrical gate cutter slidably fitted in the molding sleeve. When the molding sleeve and the gate cutter are moved toward the sprue bush in the closed state of the two molds, the opposed surface of the molding sleeve is protruded into the cavity, and at the same time the gate cutter enters the diametrically expanded portion, whereby a cylindrical space can be defined, as a portion of the cavity, between the inner peripheral surface of the diametrically expanded portion and the outer peripheral surface of the gate cutter, while maintaining the distance between the opposed surface of the molding sleeve and the opposed surface of the sprue bush shorter than the thickness of the intermediate for an optical recording medium. This makes it is possible to accurately and positively mold the intermediate for an optical recording medium, which has the circular recess formed in the central portion of the other surface thereof such that the circular recess has a diameter equal to that of the central mounting hole, and the temporary central hole, smaller in diameter than the circular recess, formed in the central portion of the circular recess, with the hollow cylindrical protruding portion protruding from the one surface thereof.

Preferably, a projection for forming a recessed groove is formed on an outer periphery of the opposed surface of said molding sleeve. According to this preferred embodiment, it is possible to accurately and positively mold the intermediate for an optical recording medium, which has the recessed groove formed in the inner bottom surface of the circular recess, in the vicinity the inner peripheral surface of the intermediate defining the circular recess, along the same.

To attain the above second object, according to a fifth aspect of the present invention, there is provided a molding apparatus comprising the mold according to the third aspect of the invention and urging means urging said gate cutter toward said sprue bush, wherein after a start of injection of the resin, when pressure of the resin is high, said gate cutter is moved toward said second mold by the pressure of the resin against a urging force of said urging means, to thereby allow the resin to fill the cavity, whereas when the pressure of the resin is lowered after completion of filling of the cavity with the resin, said gate cutter is moved toward said sprue bush by the urging force of said urging means. It should be noted that a mold can be also formed by providing the above urging means in the mold described hereinabove.

According to this molding apparatus, when the resin pressure is high, the gate cutter is moved toward the second mold by the resin pressure against the urging force of the urging means, to thereby allow the resin to fill the cavity, and when the resin pressure is lowered, the gate cutter is moved toward the sprue bush by the urging force of the urging means, so that driving means, such as a hydraulic cylinder or an electric motor, can be dispensed with, which makes it possible to simplify the construction of the mold.

It should be noted that the present disclosure relates to the subject matter included in Japanese Patent Application No. 2002-282159 filed on Sep. 27, 2002, and it is apparent that all the disclosures therein are incorporated herein by reference.

BRIEF DESCRIPTION OF THE DRAWINGS

These and other objects and features of the present invention will be explained in more detail below with reference to the attached drawings, wherein:

FIG. 26 is a cross-sectional view showing the intermediates stacked on the stacker which have lost their balance and tilted due to vibrations or the like.

DESCRIPTION OF THE PREFERRED EMBODIMENTS

Figure 1:
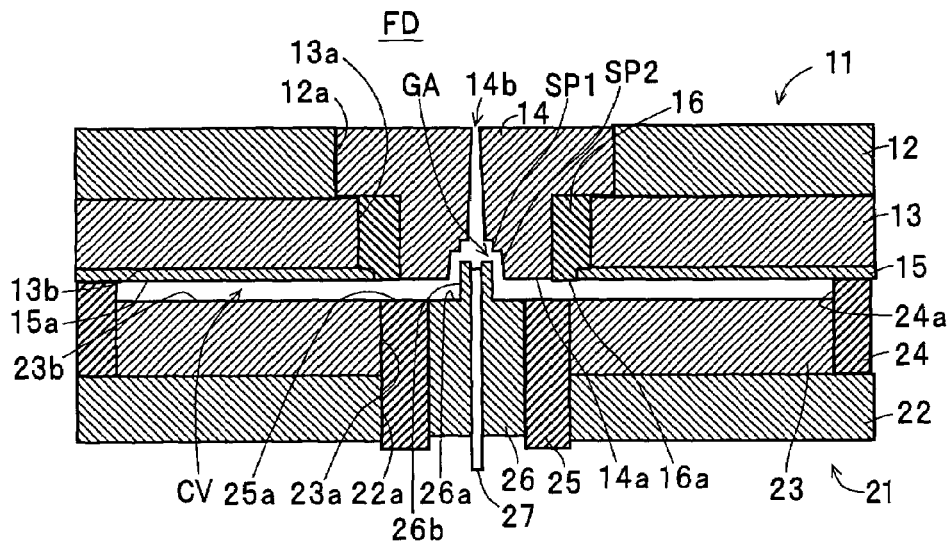
FIG. 1 is a cross-sectional view showing a mold according to an embodiment of the present invention, in its closed state.

The invention will now be described with reference to the drawings useful in describing an intermediate for an optical recording medium, a mold, a molding apparatus, and a method of manufacturing the optical recording medium, according to a preferred embodiment of the invention. It should be noted that component elements identical in construction to those of the optical recording medium 1 and the intermediate ME described hereinbefore are designated by identical reference numerals, and detailed description thereof is omitted.

Figure 9:
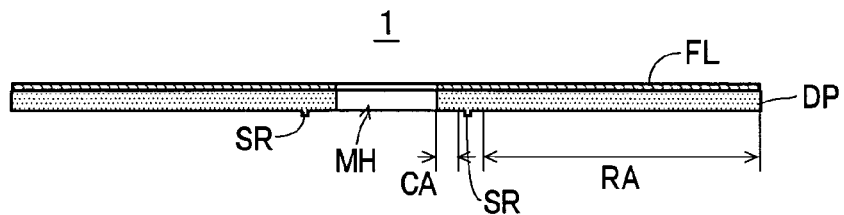
FIG. 9 is a cross-sectional view showing the construction of an optical recording medium manufactured by a method of manufacturing an optical recording medium, according to the embodiment of the present invention.

First, the construction of the optical recording medium 1 manufactured by the method of manufacturing an optical recording medium according to the present invention will be described with reference to FIG. 9.

The optical recording medium 1 is formed by forming a layer FL on one surface (upper surface, as viewed in FIG. 9: functional layer-forming surface) of a disk-shaped substrate DP. In this embodiment, the disk-shaped substrate DP is formed e.g. of a thermoplastic resin (polycarbonate, for example) and has a disk shape with a thickness of approximately 1.1 mm and a diameter of approximately 120 mm. The disk-shaped substrate DP has a central portion thereof formed with a central mounting hole MH having a diameter of approximately 15 mm, and within a recording area RA on the one surface of the disk-shaped substrate DP, there are formed micro asperities such as grooves. Further, on the other surface (lower surface, as viewed in FIG. 9: the opposite surface to the functional layer-forming surface) of the disk-shaped substrate DP, there is formed an annular projection SR having a diameter of approximately 35 mm. The layer FL is comprised of various functional layers, such as a reflection layer, a recording layer, and a protective layer (cover layer), sequentially deposited on the disk-shaped substrate DP in the mentioned order. The layer FL has a thickness of approximately 0.1 mm in total. In the present embodiment, at least the protective layer formed of resin (light-transmitting resin) coated all over the one surface of the disk-shaped substrate DP is a functional layer formed by the spin coating method, while the reflection layer formed of Ag, Au, Al, or the like within the recording area RA is a functional layer formed by the sputtering method. Further, when a phase-change material is used to form the recording layer, the recording layer is also a functional layer formed by the sputtering method.

Next, a description will be given of the mold FD for manufacturing the intermediate for use in manufacturing the optical recording medium 1.

Referring first to FIG. 1, there is shown the construction of the mold FD.

Figure 4:
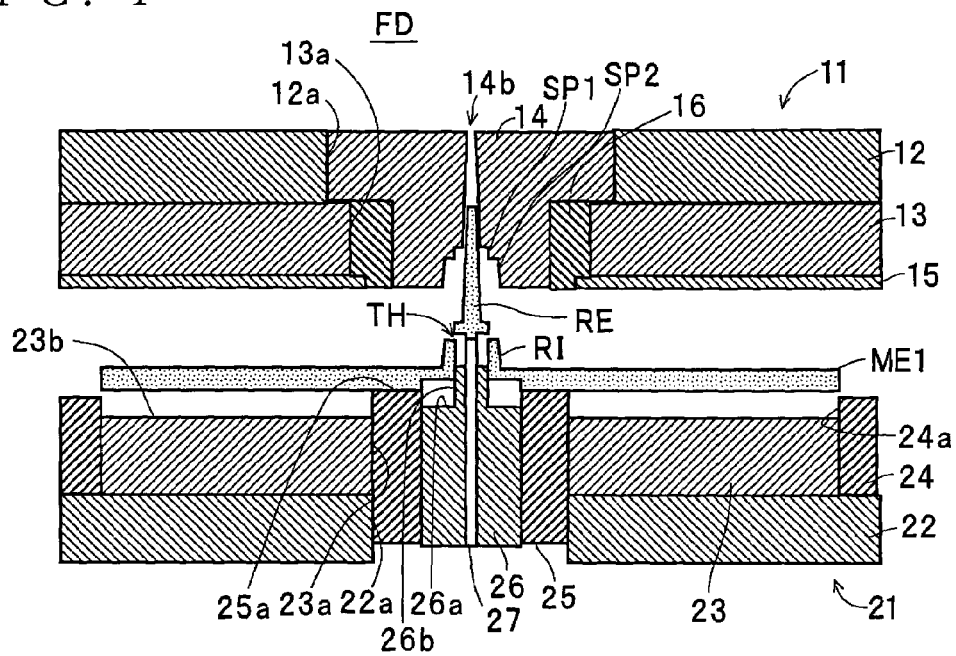
FIG. 4 is a cross-sectional view showing the mold in a state for taking out an intermediate from the mold.

As shown in FIG. 1, the mold FD is comprised of a fixed mold (first mold) 11 and a movable mold (second mold) 21 movable to and from the fixed mold 11. In the mold FD, a molten resin RE is injected from an injector nozzle NZ1 of an injection molding apparatus (molding apparatus) MM shown in FIG. 2 into a cavity CV defined between the two molds 11, 21 in a closed state thereof, whereby the intermediate ME1 formed with a temporary central hole TH and a hollow cylindrical protruding portion RI is molded as shown in FIG. 4. In the following, individual components will be described in detail.

As shown in FIG. 1, the fixed mold 11 is comprised of a fixed-side mounting plate 12, a fixed-side mirror 13, a sprue bush 14, a stamper 15, and an inner cylindrical stamper holder 16. In the present embodiment, the fixed-side mounting plate 12 is formed to have a disk shape, for example, and has a central portion thereof formed with a through hole 12a circular in cross section. The fixed-side mirror 13 is also formed to have a disk shape, and mounted on the fixed-side mounting plate 12. The fixed-side mirror 13 has a central portion thereof formed with a through hole 13a circular in cross section. The sprue bush 14 has a central portion formed with a through hole 14b opening in an opposed surface 14a opposed to the movable mold 21, via which molten resin is injected. The through hole 14b opens in the opposed surface 14a in a manner diametrically expanded e.g. with two steps, in the vicinity of the opposed surface 14a. In the present embodiment, a diametrically expanded portion SP1 as a first expanded step is formed to have an inner diameter which allows insertion of a hollow cylindrical portion of a gate cutter, referred to hereinafter, and functions as a runner. Further, the other diametrically expanded portion (diametrically expanded portion in the present invention, adjacent to the opposed surface 14a) SP2 as a second expanded step cooperates with the outer peripheral surface of the hollow cylindrical portion of the gate cutter to form a hollow cylindrical space OP as a portion of the cavity CV. The stamper 15 has a disk shape having a central portion formed with a through hole. The stamper 15 is mounted on one end of the inner cylindrical stamper holder 16 by fitting the through hole on the same, and the inner cylindrical stamper holder 16 is mounted in this state in an annular space defined between the inner peripheral surface of the through hole 13a and an outer peripheral surface of the sprue bush 14, whereby the stamper 15 is fixed to an opposed surface (cavity CV-side wall surface) 13b of the fixed-side mirror 13 opposed to the movable mold 21.

The fixed mold 11 constructed as above is mounted to the injection molding apparatus MM by having the fixed-side mounting plate 12 attached to a fixed-side platen, not shown, of the injection molding apparatus MM. The through hole 14b of the sprue bush 14 of the fixed mold 11 communicates with the injector nozzle NZ1 of the injection molding apparatus MM.

The movable mold 21 is comprised of a movable-side mounting plate 22, a movable-side mirror 23, an outer peripheral ring 24, an ejector sleeve 25, the gate cutter 26, and an ejector pin 27. In the present embodiment, the movable-side mounting plate 22 is formed to have a disk shape, and has a central portion thereof formed with a through hole 22a. The movable-side mirror 23 is formed to have a disk shape with a diameter of approximately 120 mm, and mounted on the movable-side mounting plate 22. Further, the movable-side mirror 23 has a central portion thereof formed with a through hole 23a which is circular in cross section and has the same diameter as that of the through hole 22a. The outer peripheral ring 24 is formed to have a hollow cylindrical shape, and fitted on the outer periphery of the movable-side mirror 23. The ejector sleeve 25 is formed to have a generally hollow cylindrical shape, and slidably fitted in the through holes 22a, 23a. The gate cutter 26 is formed with the hollow cylindrical portion 26b projecting from the central portion of an opposed surface 26a thereof opposed to the fixed mold 11, and slidably fitted in the ejector sleeve 25. The hollow cylindrical portion 26b is formed to have an outer diameter smaller than the inner diameter of the diametrically expanded portion SP2. Further, the ejector pin 27 having a columnar shape is slidably fitted in the central portion of the gate cutter 26. The diameter of the opposed surface 26a of the gate cutter 26 is set to be equal to that of the central mounting hole MH of the optical recording medium 1. Further, the opposed surface 26a has an ejector pin (not shown) slidably fitted therein, for pushing a portion of a molded intermediate ME1 close to the hollow cylindrical protruding portion RI for ejecting the intermediate ME1. It should be noted that one of the opposed surface 25a of the ejector sleeve 25 and the opposed surface 23b of the movable-side mirror 23 each opposed to the fixed mold 11 is formed with an annular recess (not shown) for forming the annular projection SR.

The movable mold 21 constructed as above is mounted on the injection molding apparatus MM by having the movable-side mounting plate 22 mounted to a movable-side platen, not shown, of the injection molding apparatus MM. In this case, the movable mold 21 is mounted to the injection molding apparatus MM such that the central axis of the movable mold 21 is aligned with that of the fixed mold 11 so as to allow the hollow cylindrical portion 26b of the gate cutter 26 to be movably inserted into the diametrically expanded portion SP1 of the sprue bush 14. In the closed state of the movable mold 21 and the fixed mold 11, the disk-shaped cavity CV is defined by the opposed surface 15a of the stamper 15 opposed to the movable mold 21, the opposed surfaces 14a, 16a of the sprue bush 14 and the inner cylindrical stamper holder 16 opposed to the movable mold 21, the opposed surface 23b of the movable-side mirror 23 opposed to the fixed mold 11, the inner peripheral surface 24a of the outer peripheral ring 24, the opposed surface 25a of the ejector sleeve 25 opposed to the fixed mold 11, the opposed surface 26a and the outer peripheral surface of the hollow cylindrical portion 26b of the gate cutter 26, and the inner peripheral surface of the diametrically expanded portion SP2 of the sprue bush 14. Further, a disk-shaped runner RU (see FIG. 3) is defined by the upper end face of the hollow cylindrical portion 26b and the fixed mold-side end face of the ejector pin 27, and the inner peripheral surface of the diametrically expanded portion SP1 of the sprue bush 14. A gate GA for communicating between the runner RU and the cavity CV is opened and closed by insertion/retraction of the forward end (upper portion as viewed in FIG. 1) of the hollow cylindrical portion 26b of the gate cutter 26 into/from the diametrically expanded portion SP1 of the sprue bush 14.

Figure 2:
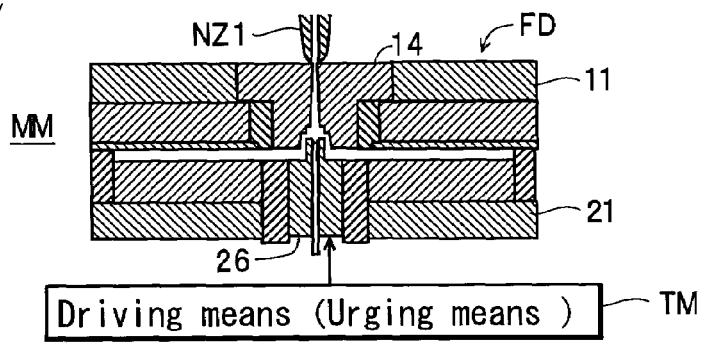
FIG. 2 is a view schematically showing the arrangement of part of an injection molding apparatus.

On the other hand, the injection molding apparatus MM to which the mold FD is mounted is provided with driving means (hydraulic cylinders, air cylinders, electric motors, or the like) for driving the movable-side mounting plate 22 (and the movable-side mirror 23), the ejector sleeve 25, the gate cutter 26, and the ejector pin 27, in a manner respectively associated therewith. It should be noted that FIG. 2 illustrates the driving means TM for the gate cutter 26.

Next, a description will be given of the method of manufacturing the optical recording medium 1.

First, as shown in FIG. 1, the stamper 15 having patterns formed thereon for forming the micro asperities, such as grooves, is set on the fixed mold 11, whereafter the movable mold 21 is moved toward the fixed mold 11 by the driving means of the injection molding apparatus MM to thereby place the mold FD in the closed state. It should be noted that in this closed state, the diametrically expanded portion SP1 and the hollow cylindrical portion 26b of the gate cutter 26 are not in contact with each other, so that the gate GA is held open, whereby communication between the through hole 14b and the cavity CV is maintained. Further, the distance between the opposed surface 15a of the stamper 15 and the opposed surface 23b of the movable-side mirror 23 (width of the cavity CV) is set to approximately 1.1 mm, which is equal to the thickness of the intermediate ME1. Then, the molten resin RE (polycarbonate, for example) is injected from the injector nozzle NZ1 of the injection molding apparatus MM. In this case, the resin RE flows into the cavity CV through the through hole 14b of the sprue bush 14, the runner RU, and the gate GA, to fill the cavity CV (filling step).

Figure 3:
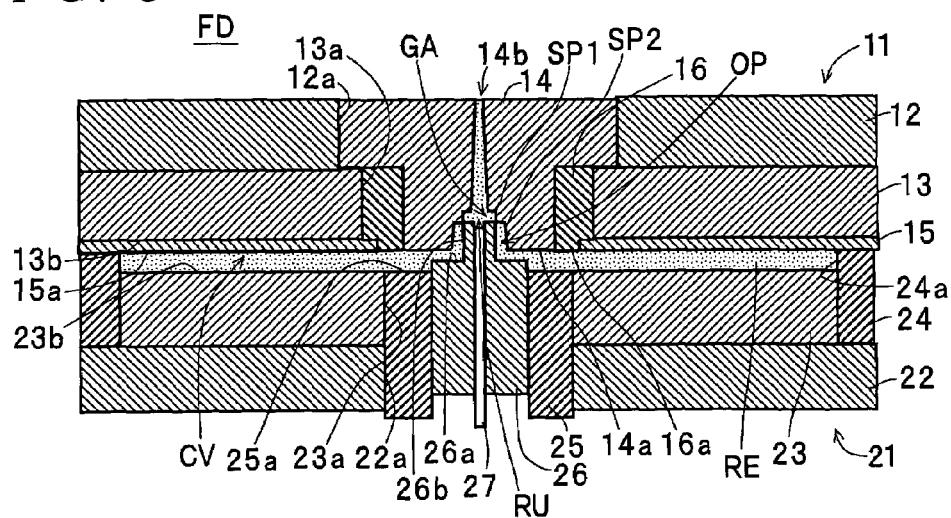
FIG. 3 is a cross-sectional view showing the mold in a state cut by a gate cutter.

After execution of the filling step, while the resin RE in the cavity CV remains soft, the driving means TM, provided in the injection molding apparatus, for driving the gate cutter 26 is operated to move the gate cutter 26 and the ejector pin 27 toward the sprue bush 14, as shown in FIG. 3. In this case, the opposed surface 26a of the gate cutter 26 is protruded into the cavity CV. More specifically, the opposed surface 26a of the gate cutter 26 is protruded toward the fixed mold 11 with respect to the opposed surface 23b of the movable-side mirror 23 and the opposed surface 25a of the ejector sleeve 25. At the same time, the hollow cylindrical portion 26b enters the diametrically expanded portion SP2. This makes the distance between the opposed surface 26a of the gate cutter 26 and the opposed surface 14a of the sprue bush 14 shorter than the thickness of the intermediate ME1. As a result, a portion of the intermediate ME1 in contact with the opposed surface 26a of the gate cutter 26 is formed to have a smaller thickness than the other part, whereby a circular recess DE, referred to hereinafter, is formed. Further, the hollow cylindrical space OP is defined as a portion of the cavity CV between the inner peripheral surface of the diametrically expanded portion SP2 and the outer peripheral surface of the hollow cylindrical portion 26b. In this state, the forward end of the hollow cylindrical portion 26b of the gate cutter 26 is inserted into the diametrically expanded portion SP1 such that it is slightly fitted therein. This causes the resin RE in the cavity CV to be cut off from the resin in the runner RU, at a location of the gate GA (gate cutting step). Thus, the intermediate ME1 for the optical recording medium 1 is molded.

Then, after the resin RE within the cavity CV is sufficiently cooled and cured, the driving means of the injection molding apparatus MM is operated to separate the movable mold 21 from the fixed mold 11 to thereby place the mold FD in its open state. More specifically, the movable-side mounting plate 22, the ejector sleeve 25, the gate cutter 26, and the ejector pin 27 are each moved away from the fixed mold 11, whereafter the ejector pin 27 is moved toward the fixed mold 11, as shown in FIG. 4, to eject the resin RE remaining in the runner RU using its tip. At the same time, the ejector sleeve 25 is moved toward the fixed mold 11 to eject the resin-molded intermediate ME1 from an annular recess defined by the outer peripheral surface of the hollow cylindrical portion 26b of the gate cutter 26, the opposed surface 26a of the gate cutter 26, the opposed surface 25a of the ejector sleeve 25, the opposed surface 23b of the movable-side mirror 23, and the inner peripheral surface 24a of the outer peripheral ring 24. Thus, the intermediate ME1 shown in FIG. 5 is manufactured.

Figure 10:
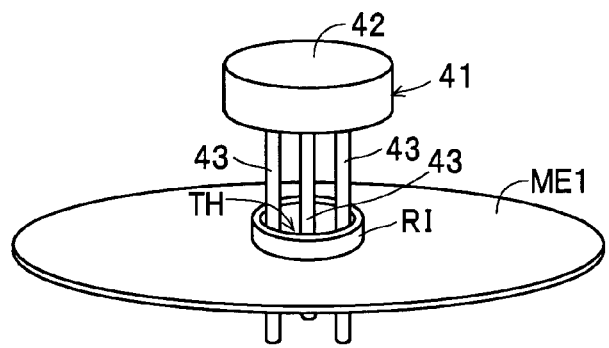
FIG. 10 is a perspective view useful in explaining a method of conveying an intermediate using a mechanical chuck.
Figure 11:
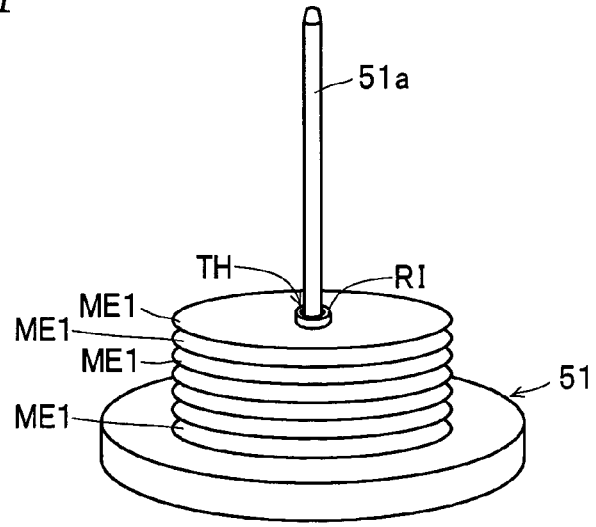
FIG. 11 is a perspective view useful in explaining a method of storing intermediates using a stacker.

In the present embodiment, the intermediate ME1 is formed to have a disk shape having a thickness of approximately 1.1 mm and a diameter of approximately 120 mm. Further, the intermediate ME1 has its other surface (lower face as viewed in FIG. 5) having a central portion thereof formed with the circular recess DE having the same diameter as that of the central mounting hole MH, and the annular projection SR. The central portion of the circular recess DE is formed with the temporary central hole TH smaller in diameter than the circular recess DE. The temporary central hole TH is used, as shown in FIG. 10, for inserting chucks 43, 43, 43 of a mechanical chuck 41 therethrough for conveyance of the intermediate ME1. The temporary central hole TH is also used, as shown in FIG. 11, for inserting a stack pole 51a of a stacker 51 therethrough for placing the intermediate ME1 on the stacker 51 for storage. The diameter of the stack pole 51a is set to be slightly smaller than that of the temporary central hole TH. In this case, when the strengths of the chucks 43 and the stack pole 51a are considered, reduction of the sizes and diameters of these is inevitably limited. Therefore, the diameter of the temporary central hole TH is set to 2 mm or larger, and preferably 3 mm or larger. In the intermediate ME1 according to the present embodiment, the diameter of the temporary central hole TH is set to 5 mm, by way of example.

Figure 5:
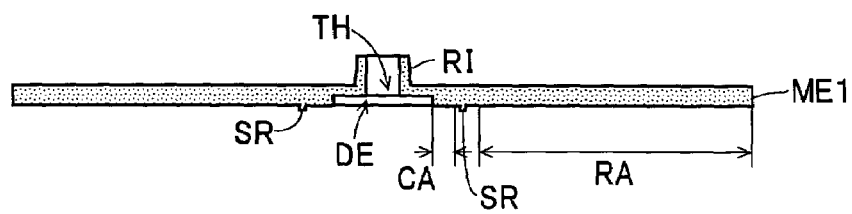
FIG. 5 is a cross-sectional view showing the construction of the intermediate according to the embodiment of the present invention.

Further, as shown in FIG. 5, on the one surface (upper surface as viewed in FIG. 5) of the intermediate ME1, there is formed the hollow cylindrical protruding portion RI, and the central axis of the hollow cylindrical protruding portion RI is configured to be (coaxially) aligned (typical state of "substantially aligned") with the center of the temporary central hole TH. In the present embodiment, the hollow cylindrical protruding portion RI has an inner diameter thereof set to be equal to the diameter (4 mm) of the temporary central hole TH, and protrudes from the rim of the temporary central hole TH. The hollow cylindrical protruding portion RI is punched simultaneously when the central portion of the intermediate ME1 is blanked by presswork to form the central mounting hole MH (see FIG. 9). Therefore, it is necessary to set the outer diameter of the hollow cylindrical protruding portion RI at its maximum to be equal to or smaller than the diameter (15 mm) of the central mounting hole MH. Further, when the resin R is applied to the one surface of the intermediate ME1 by the spin coating method, it is necessary to drop the resin R from a nozzle NZ onto the vicinity of the outer peripheral surface of the hollow cylindrical protruding portion RI. In this case, it has been found by experiment that the resin R is required to be dropped within approximately 10 mm of the center of the intermediate ME1 so as to form a substantially uniform layer of the resin R while holding variation in the thickness of the layer of the resin R at least in the recording area RA, within approximately 5 μm. Further, it has also been found by experiment that it is necessary to drop the resin R within approximately 7 mm of the center of the intermediate ME1, so as to achieve more uniform coating by holding the variation in the thickness of the resin R in the recording area RA within approximately 3 μm. Therefore, the outer diameter of the hollow cylindrical protruding portion RI is set to approximately 10 mm or less, and more preferably approximately 7 mm or less. In the intermediate ME1 according to the present embodiment, the outer diameter of the hollow cylindrical protruding portion RI is set to 6 mm, by way of example.

Further, the length of projection of the hollow cylindrical protruding portion RI from the one surface of the intermediate ME1 is required to be set to 0.5 mm or more so as to allow a required amount of resin R to be dropped as well as to prevent the dropped resin R from entering the temporary central hole TH, while suppressing the variation in the thickness of the resin R in the recording area RA. When a margin of safety is taken into consideration, the length of projection of the hollow cylindrical protruding portion RI is preferably set to 1 mm or more. In the intermediate ME1 according to the present embodiment, the length of projection of the hollow cylindrical protruding portion RI is set to 3 mm, by way of example.

The other part of the intermediate ME1 than the central portion to be blanked by presswork is identical in construction to the corresponding part of the optical recording medium 1. Therefore, within the recording area RA on the one surface of the intermediate ME1, there are formed micro asperities such as grooves. Further, on the other surface of the intermediate ME1, there is formed the annular projection SR. Intermediates ME1 molded as above are stored in a state vertically stacked one upon another, as shown in FIG. 11, using the stacker 51. The use of the stacker 51 makes it possible to store the intermediates ME1 stably while saving space. In this stored state of the intermediates ME1, one of the hollow cylindrical protruding portion RI and the annular projection SR of each intermediate ME1 is in abutment with the upper or lower surface of an adjacent intermediate ME1, whereby a space is formed between each adjacent two of the intermediates ME1.

Figure 6:
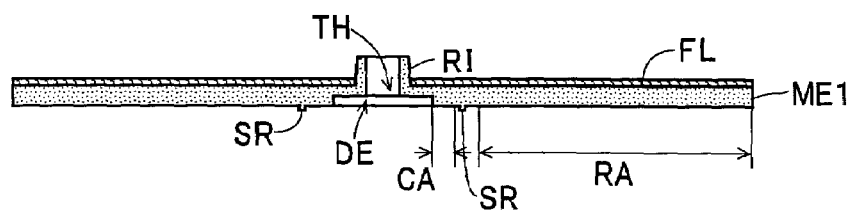
FIG. 6 is a cross-sectional view showing the intermediate having a layer formed thereon.
Figure 7:
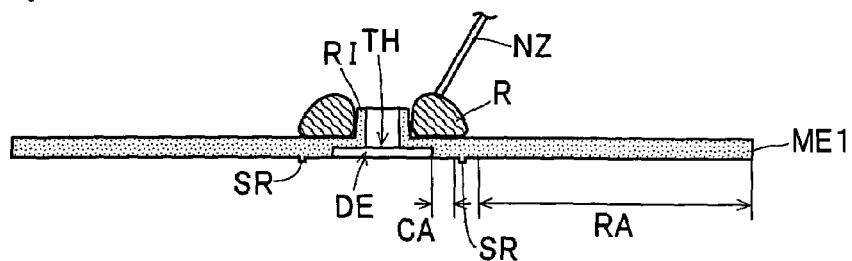
FIG. 7 is a cross-sectional view showing the intermediate having resin dropped thereon.

Then, as shown in FIG. 6, the layer FL comprised of a plurality of functional layers is formed on the one surface of the intermediate ME1 by the sputtering method and the spin coating method (functional layer-forming step). In this step, a functional layer formed by the sputtering method (e.g. the reflection layer, or the recording layer formed of a phase-change material) is formed within the recording area RA using an inner peripheral mask and an outer peripheral mask. It should be noted that it is possible to form a functional layer on a portion radially inward of the recording area RA by the sputtering method using an inner peripheral mask with a reduced diameter. On the other hand, a functional layer formed by the spin coating method (e.g. a protective layer) is formed by dropping the resin R directly from the nozzle NZ onto the vicinity of the outer peripheral surface of the hollow cylindrical protruding portion RI, as shown in FIG. 7, and then spreading (drawing) the resin R to the outer periphery of the intermediate ME1 by spinning the intermediate ME1, and curing the spread resin R. In the present embodiment, since the outer diameter of the hollow cylindrical protruding portion RI is set to approximately 10 mm or less, it is possible to drop the resin R onto an area close to the center of the intermediate ME1 without using the disk-shaped member DI. In addition, it is possible to drop the required amount of resin R while preventing the dropped resin R from entering the temporary central hole TH by the hollow cylindrical protruding portion RI. By thus dropping the required amount of resin R onto the area close to the center of the intermediate ME1, the functional layer can be formed by the spin coating method such that the layer thickness distribution of the resin R is substantially uniform. The intermediate ME1 coated with the resin R is held by the mechanical chuck 41 shown in FIG. 10 and conveyed to a site where the next step (curing step) is to be executed.

For example, as shown in FIG. 10, the mechanical chuck 41 is comprised of an actuator 42 and the three chucks 43, 43, 43 each extending downward from the lower surface of the actuator 42. The chucks 43, 43, 43 are arranged at circumferentially equal intervals, and each of the chucks 43, 43, 43 has an upper end thereof attached to the actuator 42 in a manner pivotally movable in a radial direction. The actuator 42 has a capability of pivotally moving each of the chucks 43, 43, 43 with the upper end thereof as a fulcrum to thereby close and open the chucks 43, 43, 43. The actuator 42 inserts the chucks 43, 43, 43 into the temporary central hole TH in their closed state, and the opens to bring them into abutment with the inner peripheral surface of the intermediate ME1 defining the temporary central hole TH, to thereby hold the intermediate ME1. Further, the actuator 42 closes the chucks 43, 43, 43 from this state to thereby release the intermediate ME1.

Figure 8:
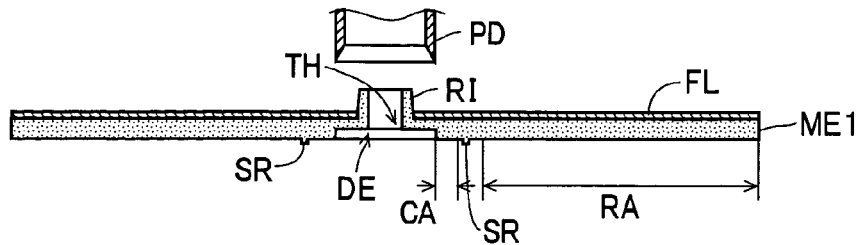
FIG. 8 is a cross-sectional view useful in explaining blanking operation for blanking a central portion (where a circular recess is formed) of the intermediate.

Then, as shown in FIG. 8, the central portion of the intermediate ME1 and the layer FL formed on the one surface of the intermediate ME1 (within approximately 15 mm of the central axis of the intermediate ME1) is blanked e.g. from the layer FL side using a punching blade (punch) PD (central hole-forming step). In this case, the outer diameter of the punching blade PD is set to be equal to or substantially equal to (actually, slightly smaller than) the diameter of the circular recess DE of the intermediate ME1. By this punching operation, the hollow cylindrical protruding portion RI and the temporary central hole TH are removed as shown in FIG. 9. At the same time, the circular recess DE is removed to form the central mounting hole MH. In this case, when the outer diameter of the punching blade PD is equal to the diameter of the circular recess DE, the central mounting hole MH is formed by removing the bottom wall (inner wall surface) of the circular recess DE, such that the central mounting hole MH has the same diameter as that of the circular recess DE. On the other hand, when the outer diameter of the punching blade PD is slightly smaller than the diameter of the circular recess DE, the central mounting hole MH is formed by the circular recess DE and a hole punched in the bottom wall of the circular recess DE using the punching blade PD, such that it is communicated with the circular recess DE. In this case, since the intermediate ME has the circular recess DE formed therein in advance, it is easier to prevent burrs from being formed on the inner peripheral surfaces of the intermediate ME and the layer FL defining the central mounting hole MH, during blanking operation by the punching blade PD, than when an intermediate is not formed with the circular recess DE. Thus, the optical recording medium 1 is manufactured which has the layer FL covering the one surface of the disk-shaped substrate DP.

As described above, according to the intermediate ME1 for the disk-shaped substrate DP, since it has the central portion thereof formed with the temporary central hole TH smaller in diameter than the central mounting hole MH, it is possible to drop the resin R onto the vicinity of the center of the intermediate ME1 without using the disk-shaped member DI, and therefore form a layer of the resin R by the spin coating method such that the layer has a substantially uniform thickness. Further, by making use of the temporary central hole TH, it is possible to positively hold the intermediate ME1 by the mechanical chuck 41 conventionally in general used. Furthermore, since the hollow cylindrical protruding portion RI having the outer diameter smaller than the diameter of the central mounting hole MH and the inner diameter equal to or larger than the diameter of the temporary central hole TH and the central axis aligned with the center of the temporary central hole TH is formed on the one surface of the intermediate ME1 in a manner protruding therefrom, it is possible to drop the resin R along the outer peripheral surface of the hollow cylindrical protruding portion RI, thereby supplying the required amount of resin R on an area closer to the center of the intermediate ME1 than the circumference of the central mounting hole MH without letting the resin R enter the temporary central hole TH. Therefore, the thickness distribution of the layer of the resin R formed by the spin coating method can be made more uniform.

Moreover, by setting the inner diameter of the hollow cylindrical protruding portion RI equal (or substantially equal) to the diameter of the temporary central hole TH, the chucks 43, 43, 43 can be brought into contact not only with the inner surface of the temporary central hole TH, but also with the inner surface of the hollow cylindrical protruding portion RI. This makes it possible to increase frictional force generated between the surfaces of the chucks 43, 43, 43 and the intermediate ME1, so that it is possible to continue holding the intermediate ME1 stably by the mechanical chuck 41 even when an increased external force due to vibrations or the like is applied to the mechanical chuck 41 and the intermediate ME1. In addition, since the circular recess DE is formed, it is possible to prevent burrs from being formed on the inner peripheral surfaces of the intermediate ME and the layer FL defining the central mounting hole MH, by blanking operation using the punch. As a result, the optical recording medium 1 can be mounted on a drive device without being made off-center, so that it is possible to reduce vibration and shake of the optical recording medium 1 during rotation thereof, which makes it possible record information thereon and reproduce information therefrom.

Figure 12:
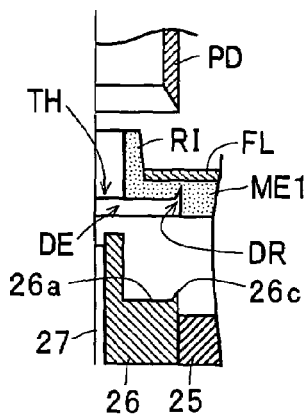
FIG. 12 is an enlarged cross-sectional view showing an outer peripheral portion of an opposed surface of a gate cutter formed with a protrusion for forming a recessed groove, and an inner peripheral surface of the circular recess, which is formed with the recessed groove, of the intermediate and its vicinity.

It should be noted that the present invention is not limited to the above embodiment, but it can be modified as required. For example, although in the above described embodiment, the entire opposed surface 26*a* of the gate cutter 26 is formed to be flat by way of example, this is not limitative, but a projection 26*c* may be formed which projects from the outer periphery of the opposed surface 26*a*, for forming a recessed groove DR, as shown in FIG. 12. The projection 26*c* is formed to have a V shape in cross section, for example. According to this construction, when the intermediate ME1 is molded, the recessed groove DR is formed, as shown in FIG. 12, in the inner bottom surface of the intermediate ME1 in the vicinity of the inner peripheral surface thereof forming the circular recess DE. In short, the outer periphery of the circular recess DE is formed to have a smaller thickness than the other portion of the same. As a result, the thickness of a portion of the circular recess DE to be actually cut by the punching blade PD can be further reduced, and hence it is possible to further facilitate blanking operation as well as to more positively prevent burrs from being formed on the inner peripheral surfaces of the intermediate ME and the layer FL defining the central mounting hole MH. It should be noted that the projection 26*c* can also be formed to have a U shape in cross section instead of the V shape. In this case, as the projection 26*c* is formed to be higher (the recessed groove DR is deeper), blanking operation by the punching blade PD can be performed more easily. However, in order to prevent an unintended rupture of the intermediate ME1 from being caused during conveyance of intermediates ME1, the portion of the intermediate ME1 forming the recessed groove DR is required to have a certain degree of thickness. Therefore, for facilitating the blanking operation while preventing the unintended rupture of the intermediate ME1, it is preferred that the height of the projection 26*c* is set such that the thickness of the portion of the intermediate ME1 in which the recessed groove DR is formed falls within a range of 0.01 mm to 0.3 mm. Further, since the recessed groove DR is formed, the portion of the intermediate ME1 forming the circular recess DE can be formed to have a larger thickness, and hence it is preferred that the thickness of the portion falls within a range of 0.3 mm to 0.7 mm. This makes it possible to ensure smooth fluidity of the resin RE for molding and the strength of the molded intermediate ME1.

Figure 13:
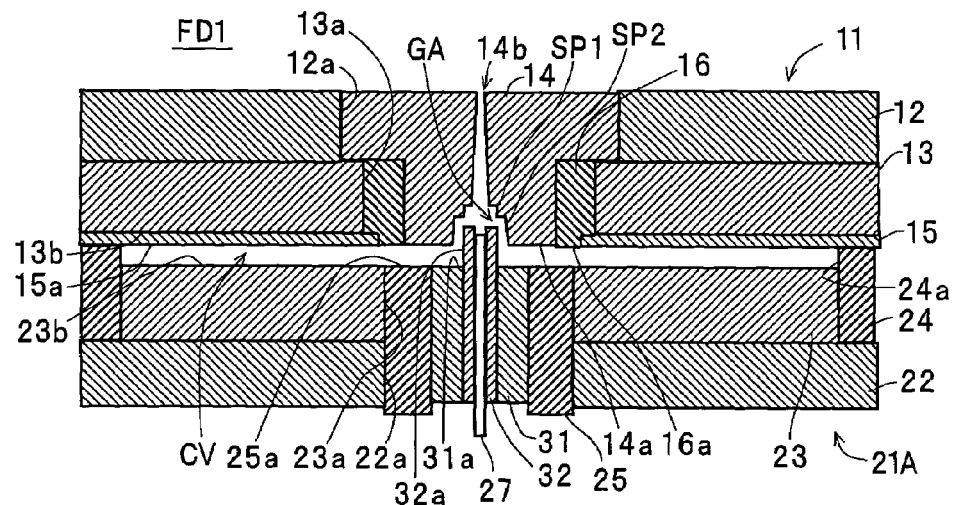
FIG. 13 is a cross-sectional view showing a mold according to a variation of the present embodiment of the present invention, in its closed state.
Figure 14:
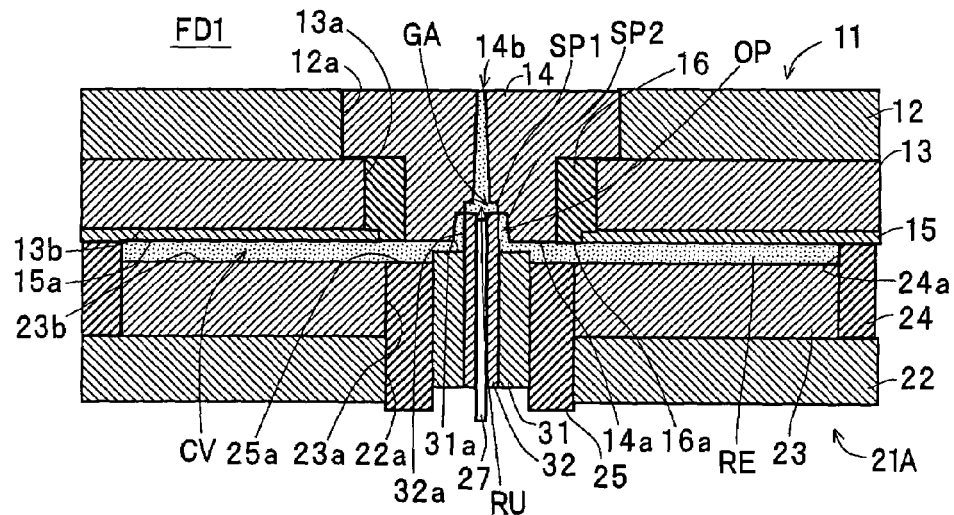
FIG. 14 is a cross-sectional view showing the mold shown in FIG. 13 in a state cut by a gate cutter.

Further, although in the present embodiment, the mold FD including the movable mold 21 provided with the gate cutter 26 having the hollow cylindrical portion 26*b* integrally formed therewith in a manner protruding from the opposed surface 26*a* is described by way of example, this is not limitative, but the intermediate ME1 can be molded using a mold FD1 as a variation of the present embodiment, which has a movable mold 21A provided with a molding sleeve (compression sleeve) 31 and a gate cutter 32, in place of the gate cutter 26, as shown in FIGS. 13, 14. In this case, the molding sleeve 31 is formed to have a hollow cylindrical shape with an outer diameter equal to that of the gate cutter 26, and slidably fitted in the ejector sleeve 25, and the gate cutter 32 is formed to have a hollow cylindrical shape with an outer diameter equal to that of the hollow cylindrical portion 26*b* of the gate cutter 26. Further, the gate cutter 32 has the cylindrical ejector pin 27 slidably fitted in the center thereof. The mold FD1 and the injection molding apparatus MM to which the mold FD1 is mounted are configured such that the molding sleeve 31 and the gate cutter 32 can be driven independently of each other.

In the case of molding an intermediate ME1 using the mold FD1, the molding sleeve 31 and the gate cutter 32 are basically driven similarly to the gate cutter 26 of the mold FD. Then, when resin RE within a cavity CV remains soft after execution of the filling step, first, the molding sleeve 31 is moved toward the sprue bush 14, as shown in FIG. 14, and thereafter the gate cutter 32 and the ejector pin 27 are moved toward the sprue bush 14, whereby the forward end of the gate cutter 32 is inserted into the diametrically expanded portion SP1 of the sprue bush 14. According to this mold FD1, it is possible to define the cavity CV having the same shape as that of the cavity CV in the mold FD, and more positively perform formation of the circular recess DE and execution of the gate cutting step.

Further, although in the above described embodiment and variation, description is given, by way of example, of the driving means for driving the gate cutter 26, or the molding sleeve 31 and the gate cutter 32 which is provided in the injection molding apparatus MM, this is not limitative, but the injection molding apparatus MM may be equipped with urging means TM formed e.g. by a spring, in place of the driving means TM, as illustrated in FIG. 2, for operation of the gate cutter 26. In this case, the urging means TM constantly urges the gate cutter 26 toward the sprue bush 14, with an urging force set such that it is held smaller than a predetermined high value of resin pressure assumed during a period after the start of injection of the resin RE into the cavity CV.

Figure 15:
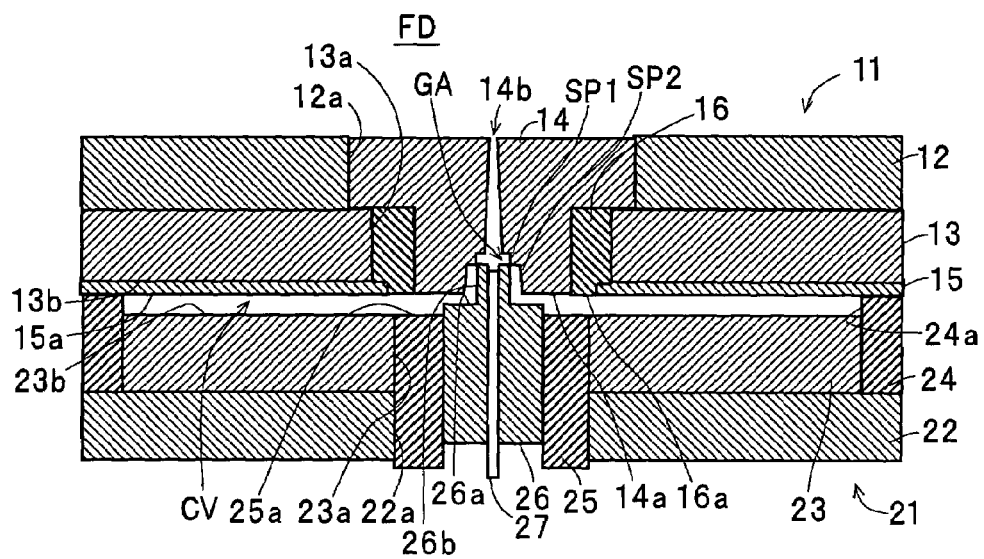
FIG. 15 is a cross-sectional view useful in explaining molding operation using the mold shown in FIG. 1 by a variation of the injection molding apparatus according to the present embodiment.
Figure 16:
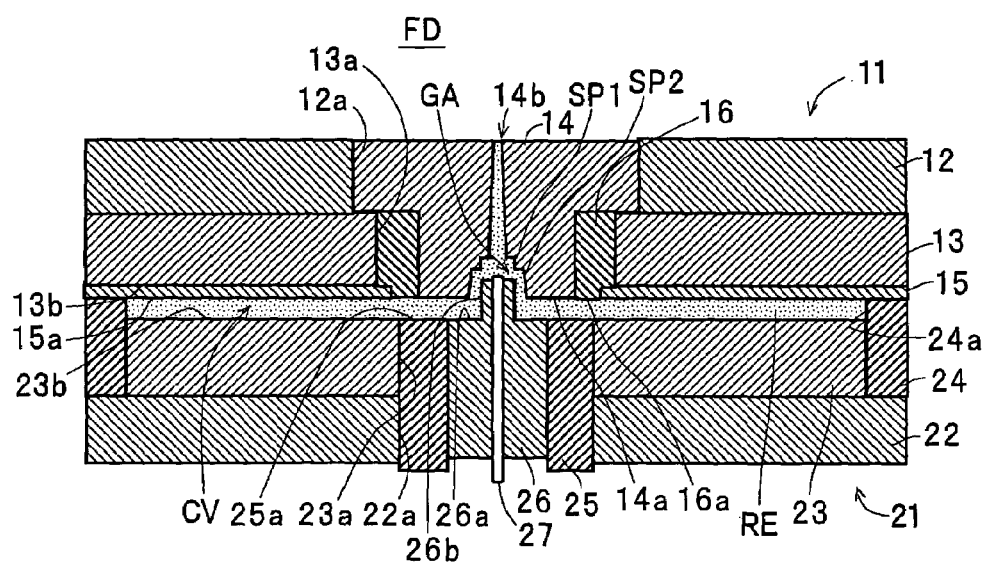
FIG. 16 is a cross-sectional view showing a state of the mold in which a cavity is filled with resin during the FIG. 15 molding operation.
Figure 17:
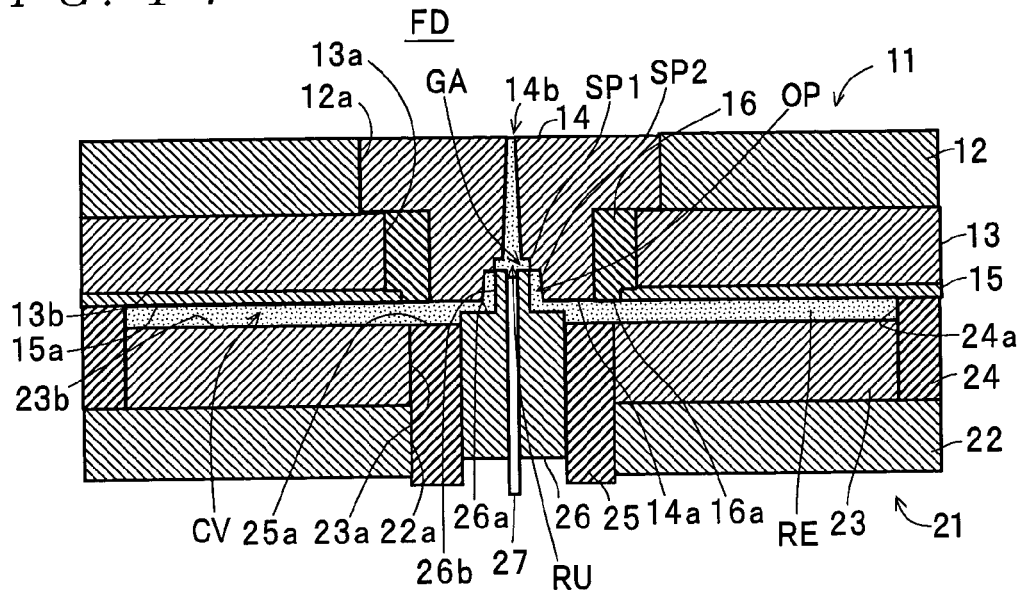
FIG. 17 is a cross-sectional view showing a state of the mold in which the gate cutter is moved from the FIG. 16 state by the urging force of urging means.

In this construction, when the mold is closed before the resin RE is injected into the cavity CV as shown in FIG. 15, the gate cutter 26 is urged toward the sprue bush 14 by the urging means TM, and the forward end of the hollow cylindrical portion 26*b* is held in contact with an inner peripheral surface of the sprue bush 14 forming the diametrically expanded portion SP1. On the other hand, when molten resin RE is injected from the injector nozzle NZ1 of the injection molding apparatus MM, resin pressure is applied to the gate cuter 26 to move the same away from the sprue bush 14. As a result, the gate GA is opened, and the resin RE is injected into the cavity CV as shown in FIG. 16. The open state of the gate GA is maintained over a time period immediately after the start of injection of the resin RE until the resin RE completely fills the cavity CV, during which the resin pressure is equal to or higher than the predetermined high value. Then, after the completion of filling of the cavity CV with the resin RE, the resin pressure starts falling to become lower than the predetermined high value. As a result, the gate cutter 26 is urged toward the sprue bush 14 by the urging means TM, and the forward end of the hollow cylindrical portion 26*b* is brought into contact with the inner peripheral surface of the sprue bush 14 forming the diametrically expanded portion SP1 as shown in FIG. 17, whereby the resin RE within the runner RU and the resin RE within the cavity CV are cut off from each other at a location of the gate GA. As described above, according to this construction, since the gate cutter 26 is moved by the urging means TM, driving means, such as a hydraulic cylinder or an electric motor, can be dispensed with, which makes it possible to simplify the construction of the mold. This also makes it possible to simplify the construction of the injection molding apparatus MM.

Although in the above described embodiment, the sprue bush 14 is formed with the through hole 14*b* opening in the vicinity of the opposed surface 14*a* in a state diametrically expanded with two steps, this is not limitative, but it is only necessary that the through hole 14b is diametrically expanded with at least one step. For example, when the through hole 14b is diametrically expanded with a single step, a cylindrical space OP defined between the inner peripheral surface of the sprue bush 14 defining the diametrically expanded portion and the outer peripheral surface of the hollow cylindrical portion 26b forms a portion of the cavity CV, and a contact portion to be brought into contact with the hollow cylindrical portion 26b, which is located at a boundary between a non-diametrically expanded portion and the diametrically expanded portion, functions as the gate GA.

The construction using the urging means TM is also applicable to the mold FD1. When the urging means TM is applied to the mold FD1, urging means for the molding sleeve 31 and urging means for the gate cutter 32 are separately provided in the injection molding apparatus MM, and the urging force of the urging means for the molding sleeve 31 is set to be slightly stronger than that of the urging means for the gate cutter 32. According to this construction, even during the time period immediately after the start of injection of the resin RE until the resin RE completely fills the cavity CV, when the resin pressure is slightly lowered in the latter half of this time period, the molding sleeve 31 is moved toward the sprue bush 14 against the resin pressure to a predetermined position, and then, when the resin pressure is completely lowered after the completion of filling of the cavity CV with the resin RE, the gate cutter 32 is moved toward the sprue bush 14 and brought into contact with the diametrically expanded portion SP1 of the sprue bush 14, whereby the resin RE within the runner RU and the resin RE within the cavity CV are cut off from each other at a location of the gate GA.

Figure 18:
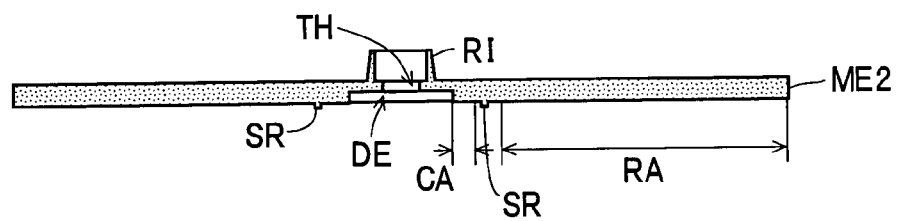
FIG. 18 is a cross-sectional view of a variation of the intermediate.
Figure 19:
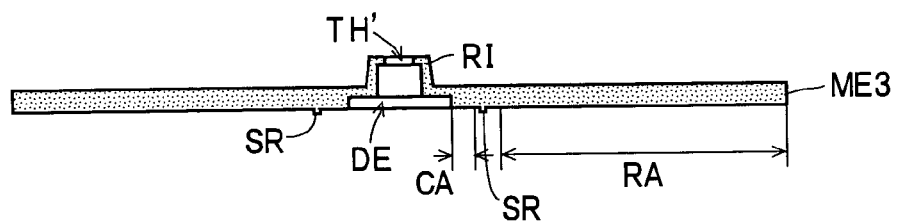
FIG. 19 is a cross-sectional view of another intermediate of the intermediate.
Figure 20:
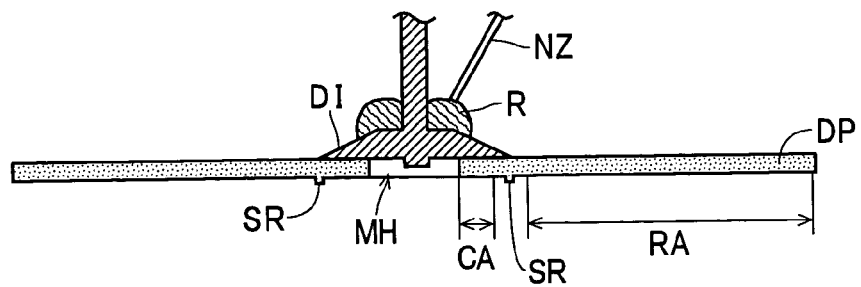
FIG. 20 is a cross-sectional view of a disk-shaped substrate with a disk-shaped member placed thereon and resin dropped on the disk-shaped member.
Figure 21:
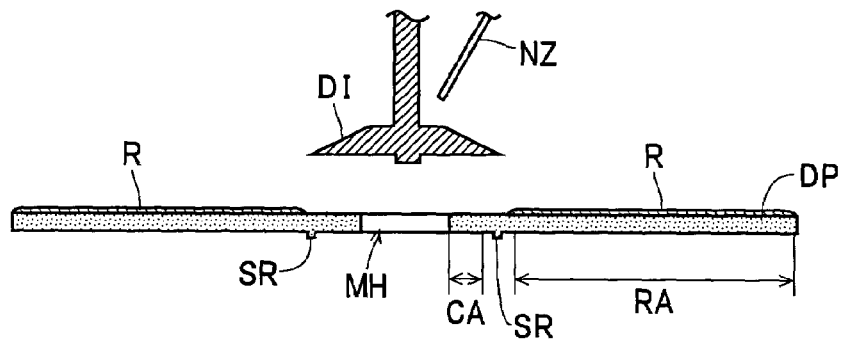
FIG. 21 is a cross-sectional view of the FIG. 20 disk-shaped substrate having a layer of the resin formed thereon by the spin coating method.
Figure 22:
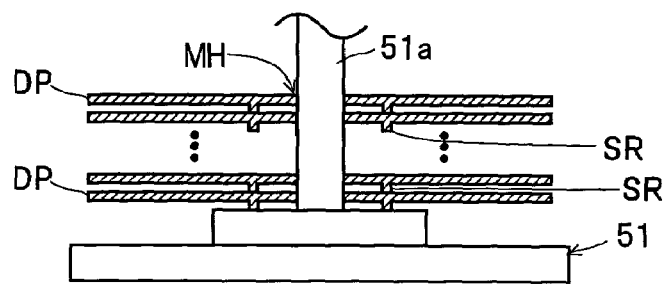
FIG. 22 is a cross-sectional view showing a plurality of disk-shaped substrates stored on a stacker.
Figure 23:
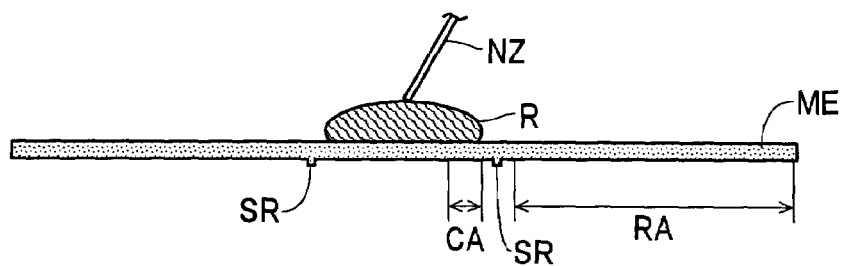
FIG. 23 is a cross-sectional view useful in explaining a method of manufacturing the optical recording medium by using another intermediate developed by the present inventors, and showing the intermediate having the resin applied onto a central portion thereof.
Figure 24:
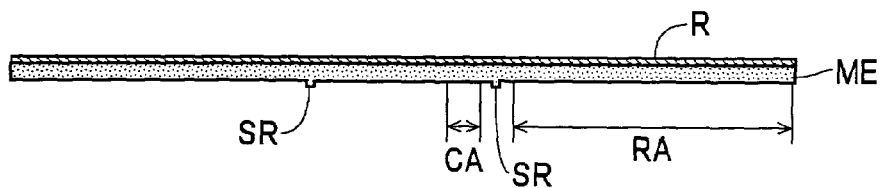
FIG. 24 is a cross-sectional view of the FIG. 23 intermediate coated with the resin by the spin coating method.
Figure 25:
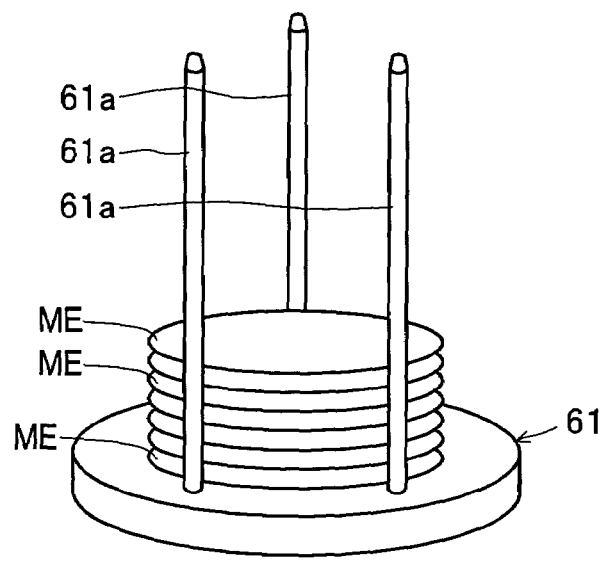
FIG. 25 is a perspective view showing a plurality of intermediates stored on a stacker.
Figure 26:
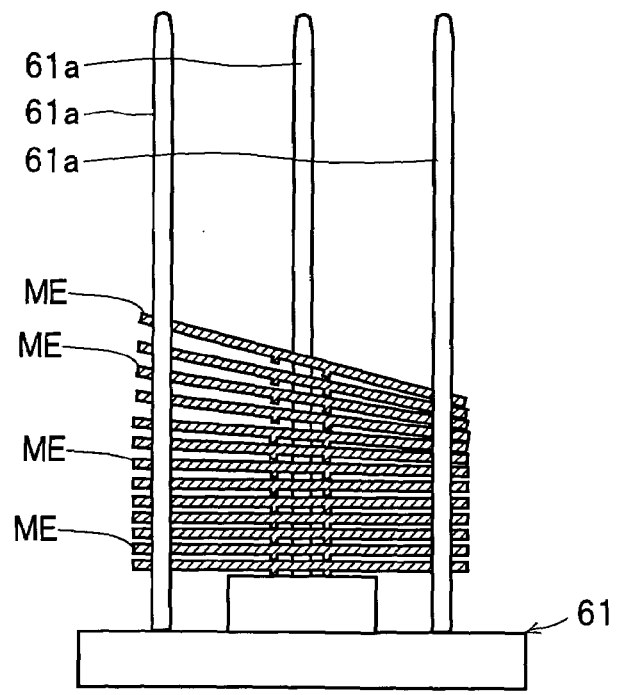

Further, the diameter of the temporary central hole may be smaller than the inner diameter of the hollow cylindrical protruding portion. More specifically, in an intermediate ME2 according to a variation of the present embodiment, shown in FIG. 18, a temporary central hole TH is formed in the bottom wall (inner wall surface) of a circular recess DE such that it has a diameter smaller than the inner diameter of the hollow cylindrical protruding portion RI. The intermediate ME2 constructed as above can provide the same advantageous effects as obtained by the intermediate ME1. Further, as in the case of an intermediate ME3 according to another variation of the present embodiment, shown in FIG. 19, a hole TH' which corresponds to the temporary central hole TH and has a diameter smaller than the inner diameter of the hollow cylindrical protruding portion RI can be formed through a top provided in a manner closing an end of a hollow cylindrical protruding portion RI. The intermediate ME3 constructed as above can also provide the same advantageous effects as obtained by the intermediates ME1, ME2.

What is claimed is:

1. An intermediate for an optical recording medium that has a central mounting hole formed in a central portion thereof and at least one kind of functional layer formed on one side thereof, for use in at least one of information recording and information reproduction, the intermediate being produced beforehand for manufacturing the optical recording medium, the intermediate comprising a hollow cylindrical protruding portion protruding from one surface thereof on the same side as the one side of the optical recording medium, wherein the intermediate has a circular recess formed in a central portion of the other surface thereof on a side opposite to the one side of the optical recording medium and having a diameter equal to a diameter of the central mounting hole, and a temporary central hole formed to extend through a central portion of the circular recess and having a diameter smaller than the diameter of the circular recess, said hollow cylindrical protruding portion having an outer diameter smaller than the diameter of the central mounting hole and an inner diameter equal to or larger than the diameter of the temporary central hole, and having a central axis thereof substantially aligned with a center of the temporary central hole.

2. An intermediate as claimed in claim 1, wherein a recessed groove is formed in an inner bottom surface of the circular recess, in the vicinity of an inner peripheral surface of the intermediate defining the circular recess, along the inner peripheral surface.

3. An intermediate as claimed in claim 1, wherein the diameter of the temporary central hole is set to be equal to or larger than 2 mm.

4. An intermediate as claimed in claim 1, wherein the outer diameter of said hollow cylindrical protruding portion is set to be equal to or smaller than 10 mm.

5. An intermediate as claimed in claim 1, wherein a length of protrusion of said hollow cylindrical protruding portion from the one surface of the intermediate is set to be equal to or larger than 0.5 mm.

6. An intermediate, as claimed in claim 1, wherein the inner diameter of said hollow cylindrical protruding portion is set to be equal to the diameter of the temporary central hole.

7. A method of manufacturing an optical recording medium that has a central mounting hole formed in a central portion thereof and at least one kind of functional layer formed on one side thereof, for use in at least one of information recording and information reproduction, the method including:

preparing an intermediate as claimed in claim 1 by resin molding;

forming the at least one kind of functional layer on the one surface of the prepared intermediate; and forming the central mounting hole through the intermediate having the at least one kind of functional layer formed thereon.

* * * * *